(12) United States Patent
LaFleur et al.

(10) Patent No.: US 8,084,543 B2
(45) Date of Patent: *Dec. 27, 2011

(54) LIGHT-SCATTERING COMPOSITIONS

(75) Inventors: Edward E. LaFleur, Holland, PA (US); Jiun-Chen Wu, Robbinsville, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,178

(22) Filed: Jan. 10, 2011

(65) Prior Publication Data

US 2011/0105677 A1    May 5, 2011

Related U.S. Application Data

(63) Continuation of application No. 12/008,850, filed on Jan. 15, 2008, now Pat. No. 7,893,162.

(51) Int. Cl.
   - *C09K 3/00*   (2006.01)
   - *C08L 33/04*  (2006.01)
   - *C08L 31/06*  (2006.01)
   - *C08L 33/06*  (2006.01)

(52) U.S. Cl. .............. 525/228; 525/64; 525/81; 525/85; 252/182.11

(58) Field of Classification Search ............. 525/55, 525/85, 64, 81, 228; 252/182.11; 362/558
See application file for complete search history.

(56) References Cited

U.S. PATENT DOCUMENTS

| 5,237,004 A * | 8/1993 | Wu et al. .................. 525/85 |
| 5,237,007 A | 8/1993 | Colella |
| 5,346,954 A | 9/1994 | Wu et al. |
| 2002/0167112 A1 | 11/2002 | Colburn, Jr. et al. |
| 2004/0005453 A1 | 1/2004 | Leyrer et al. |
| 2005/0049368 A1 | 3/2005 | Maruyama et al. |
| 2005/0275767 A1 * | 12/2005 | Huang et al. ............. 349/64 |
| 2006/0148946 A1 | 7/2006 | Lee et al. |
| 2006/0268106 A1 | 11/2006 | Cooper et al. |

FOREIGN PATENT DOCUMENTS

| JP | 2005112971 A1 | 4/2005 |
| JP | 2005140863 A1 | 6/2005 |
| JP | 2005213410 A1 | 8/2005 |
| JP | 2005213422 A1 | 8/2005 |
| JP | 2005220157 A1 | 8/2005 |
| JP | 2006023350 A1 | 1/2006 |
| JP | 2006084927 A1 | 3/2006 |

OTHER PUBLICATIONS

Brandrup et al; Polymer Handbook; Fourth Edition; 1999; pp. VI / 579-582.*

* cited by examiner

*Primary Examiner* — Karuna P Reddy

(74) *Attorney, Agent, or Firm* — Thomas S. Deibert

(57) ABSTRACT

Light-scattering compositions comprising diffuser polymer particles are disclosed. Also disclosed are methods of making and using the light-scattering compositions.

10 Claims, No Drawings

LIGHT-SCATTERING COMPOSITIONS

This application is a continuation of application Ser. No. 12/008,850 filed on Jan. 15, 2008.

The present invention relates to light-scattering compositions and methods of making and using the same. In particular, the present invention relates to light-scattering compositions comprising diffuser polymer particles.

Light-diffusing polymers are often "semi-transparent" or translucent to visible light, that is, they scatter transmitted light, preferably without significantly reducing its intensity. They may be clear or colored, and may be incorporated into clear or colored thermoplastic or thermoset polymer matrices to form light-scattering thermoplastic or thermoset polymer compositions which may be formed into sheets or films of various thicknesses, or into more complex shapes. Such compositions find use as light diffusers in, for example, luminaires, rear projection screens for television or film viewing, decoration, illuminated signs (especially back-lit translucent signs), skylight, lighting fixtures (especially for fluorescent or incandescent lighting), greenhouse glazing, light boxes, drafting tables, automotive sunroofs, artistic applications (e.g., as visual display-case components), antiglow screens for CRT units, twin-wall glazing and covers for automotive lights.

Japanese Patent Publication No. 64-10515 discloses a method for producing a translucent resin comprising mixing fine particles of a bridging polymer in a transparent resin of a base material, said bridging polymer particles having an average diameter of 0.5 to 5 μm and differing in refractive index from the matrix by 0.05 to 0.3 units. However, the grow-out process taught therein for making the particles suggests that an appreciable quantity of small particles are produced. The reference requires a bridging monomer which is a crosslinking monomer.

U.S. Pat. No. 5,237,004 to Wu et al. discloses a thermoplastic composition having modified optical properties. Wu et al. disclose a thermoplastic composition having modified optical properties which comprises a thermoplastic matrix polymer and, distributed throughout the matrix polymer, from about 0.1% to about 40% of the total composition weight of spherical polymer particles of core/shell having an average diameter of from about 2 to about 15 μm and a size distribution such that at least 90% by weight of the polymer particles fall within ±20% of the average particle diameter, a core of rubbery alkyl acrylate polymer and one or more shells, the outer shell of which is compatible with the matrix polymer.

Nevertheless, there remains a need for identifying new polymer compositions having modified optical properties for use in ever more demanding applications, including display screens and lighting diffusers.

In one aspect of the present invention, there is provided a light-scattering composition, comprising diffuser polymer particles; wherein the diffuser polymer particles have an average particle size of 0.3 to 1.9 μm; wherein the diffuser polymer particles comprise >4 wt % crosslinking density; wherein the diffuser polymer particles exhibit a different refractive index at a center thereof ($RI_{center}$) than at a surface thereof ($RI_{surface}$); wherein $RI_{center} < RI_{surface}$; and wherein the diffuser polymer particles are single phase particles.

In another aspect of the present invention, there is provided a light-scattering composition, comprising a matrix polymer and diffuser polymer particles; wherein the diffuser polymer particles have an average particle size of 0.3 to 1.9 μm; wherein the diffuser polymer particles comprise >4 wt % crosslinking density; wherein the diffuser polymer particles exhibit a different refractive index at a center thereof ($RI_{center}$) than at a surface thereof ($RI_{surface}$); wherein $RI_{center} < RI_{surface}$; wherein the diffuser polymer particles are single phase particles; wherein the diffuser polymer particles are distributed throughout the matrix polymer and wherein the diffuser polymer particles comprise 0.1 to 10 wt % of the light-scattering composition.

In another aspect of the present invention, there is provided a flat panel display having a diffusion layer comprising a light-scattering composition of the present invention, wherein the diffusion layer is 0.45 mm to 4 mm thick.

In another aspect of the present invention, there is provided a lighting diffuser comprising a light-scattering composition of the present invention.

The term "copolymer" as used herein and in the appended claims refers to polymers polymerized from at least two different monomers.

The term "average particle size" as used herein and in the appended claims is the $d^{50}$ value measured on a Malvern Instruments particle size analyzer Mastersizer 2000.

The term "$RI_{center}$" as used herein and in the appended claims refers to the refractive index measured at the center of the diffuser polymer particles in glycerol using a Zeiss Jenaval Interphako Interference Microscope.

The term "$RI_{surface}$" as used herein and in the appended claims refers to the refractive index measured at the surface of the diffuser polymer particles in glycerol using a Zeiss Jenaval Interphako Interference Microscope.

The term "single phase" as used herein and in the appended claims in reference to the diffuser polymer particles means that the subject particles exhibit a gradual increase in RI from the center to the surface. The term single phase refers to the "as made" diffuser polymer particles. One of ordinary skill in the art will recognize that the diffuser polymer particles can in certain situations be modified upon combination with the matrix polymer. For example, the diffuser polymer particles and the matrix polymer can in certain situations interact to form a shell like structure at the interface between the diffuser polymer particles and the matrix polymer.

The term "monovinyl arenes" used herein and in the appended claims encompasses monoethylenically unsaturated aromatic monomers including styrene, alkylstyrenes (e.g., methylstyrene and ethylstyrene), other substituted vinylbenzenes wherein the substitutents do not interfere with polymerization, and vinyl polycyclic aromatic monomers.

In some embodiments of the present invention, the matrix polymer is selected from thermoplastic polymers, thermoset polymers and combinations thereof. In some aspects of these embodiments, the matrix polymer is selected from translucent polymers and transparent polymers. In some aspects of these embodiments, the matrix polymer is selected from transparent polymers that have a glass-transition temperature ≧50° C. In some aspects of these embodiments, the matrix polymer is selected from polymers that are amorphous following incorporation of the diffuser polymer particles of the present invention, and that remain amorphous following processing to form a light-scattering composition of the present invention.

In some embodiments of the present invention, the matrix polymer exhibits an elastic modulus of 1,400 to 3,500 MegaPascals (MPa).

In some embodiments of the present invention, the matrix polymer is capable of being formed into shaped articles by molding, casting, extrusion or other processes apparent to one of ordinary skill in the art.

In some embodiments of the present invention, the light scattering composition is formed into a film or sheet. In some aspects of these embodiments, the film has an average thickness of 21 to 250 µm. In some aspects of these embodiments, the film has an average thickness of 70 to 125 µm. In some aspects of these embodiments, the sheet has a thickness of 0.45 to 4 mm. In some aspects of these embodiments, the sheet has a thickness of 0.5 to 3 mm.

In some embodiments of the present invention, the matrix polymer is prepared from chain growth polymerization or step growth polymerization.

In some embodiments of the present invention, the matrix polymer is produced using or comprises materials selected from acrylonitrile-butadiene-styrene (ABS), polyolefins, polycarbonates, polycarbonate-polyester blends, polyamides, poly(alkylene terepthalates), polystyrene, cyclo-olefins, polystyrene/methacrylate blends, and combinations thereof. In some aspects of these embodiments, the matrix polymer is produced using or comprises materials selected from acrylonitrile-butadiene-styrene (ABS), polyolefins, polycarbonates, polycarbonate-polyester blends, polyamides, poly(alkylene terephthalates), polystyrene, cyclo-olefins and polystyrene/methacrylate blends.

In some embodiments of the present invention, the matrix polymer is selected from polymethyl methacrylate, polystyrene, styrene-acrylonitrile compolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride copolymers, cyclic olefin copolymers and combinations thereof.

In some embodiments of the present invention, the matrix polymer is produced using materials selected from alkyl (alkyl)acrylate, vinyl aromatics, vinyl chloride, cellulose acetate butyrate, poly(ethylene terepthalate), poly(cyclohexanedimethanol terephthalate), derivatives thereof, copolymers thereof and refractive index matched blends thereof. In some aspects of these embodiments, the matrix polymer is produced using materials selected from copolymers of methyl methacrylate with alkyl acrylates, styrene with up to 40 wt % acrylonitrile, styrene with methyl methacrylate, alpha-methylstyrene with methyl methacrylate and alkyl acrylates, vinyl chloride and vinyl acetate, vinyl chloride and propylene. In some aspects of these embodiments, the alkyl acrylates are selected from $C_{1-8}$ alkyl acrylates and derivatives thereof.

In some embodiments of the present invention, the matrix polymer is produced using materials selected from a copolymer of methyl methacrylate with 1 to 15 wt % $C_{1-8}$ alkyl acrylate.

In some embodiments of the present invention, the matrix polymer is produced using materials selected from poly(vinyl acetate), plasticized vinyl chloride homopolymers, plasticized vinyl chloride copolymers and plasticized cellulosic esters.

In some embodiments of the present invention, the matrix polymer is produced using materials selected from thermoset polymers. In some aspects of these embodiments, the matrix polymer is thermoset as prepared (e.g., such as in casting of a sheet of poly(methyl methacrylate) containing sufficient polyfunctional monomer to immobilize and insolubilize the resulting sheet). In some aspects of these embodiments, the matrix polymer is rendered thermoset during subsequent processing (e.g., after initial polymerization is completed such as by activating a cure reaction by heating of the initially polymerized sheet). In some aspects of these embodiments, the matrix polymer is produced using materials selected from methyl methacrylate, styrene, vinyl chloride, imidized polymers of methyl methacrylate (known as polyglutarimides), copolymers of methyl methacrylate with alkyl acrylates, copolymers of styrene with up to 40% acrylonitrile, copolymers of styrene with methyl methacrylate, copolymers of alpha-methylstyrene with methyl methacrylate and alkyl acrylates; copolymers of vinyl chloride with vinyl acetate and copolymers of vinyl chloride with propylene.

In some embodiments of the present invention, the matrix polymer is produced using compatible or refractive-index matched polymer blends. In some aspects of these embodiments, the matrix polymer is produced using materials selected from copolymers of methyl methacrylate with 1 to 15 wt % alkyl acrylates. In some aspects of these embodiments the alkyl acrylates are selected from $C_{1-8}$ alkyl acrylates. In some aspects of these embodiments, the matrix polymer is further derived or produced using a polyfunctional dimethacrylate. In some aspects of these embodiments, the matrix polymer is further derived or produced using 0.05 to 2 wt % polyfunctional dimethacrylate. In some aspects of these embodiments, the matrix polymer is further derived or produced using acrylamide and N-methylolacrylamide. In some aspects of these embodiments, the matrix polymer is further derived or produced using 0.05 to 5 wt % acrylamide and N-methylolacrylamide.

In some embodiments of the present invention, the matrix polymer is selected from polymers formed through condensation reactions and/or ring-opening reactions. In some aspects of these embodiments, the matrix polymer is produced through polyesterification in the presence of multifunction glycols or by epoxide polymerization in the presence of trifunctional epoxides.

In some embodiments of the present invention, the matrix polymer is an optical grade material.

In some embodiments of the present invention, the matrix polymer has a refractive index of from 1.49 to 1.59.

In some embodiments of the present invention, the matrix polymer has a yellowness index of $\leq 1$.

In some embodiments of the present invention, the matrix polymer has a haze of $\leq 1\%$.

In some embodiments of the present invention, the matrix polymer has a yellowness index of $\leq 1$ and a haze of $\leq 1\%$.

In some embodiments of the present invention, the diffuser polymer particles are produced using step reaction or chain growth polymerization. In some aspects of these embodiments, the diffuser polymer particles are produced using one or more vinyl monomers. In some aspects of these embodiments, the diffuser polymer particles comprise rubbery polymers. In some aspects of these embodiments, the diffuser polymer particles comprise glassy polymers. In some aspects of these embodiments, the diffuser polymer particles are produced through free-radical initiated polymerization. In some aspects of these embodiments, the diffuser polymer particles are prepared through polymerization or copolymerization of monomers selected from diolefins (e.g., butadiene, isoprene); vinyl aromatic monomers (e.g., styrene, chlorostyrene); vinyl esters (e.g., vinyl acetate, vinyl benzoate); acrylonitrile; methylacrylonitrile; (meth)acrylate esters (e.g., methyl methacrylate, butyl methacrylate, phenyl methacrylate, ethyl acrylate, butyl acrylate, 2-ethylhexyl acrylate, benzyl acrylate); and vinyl chloride. In some aspects of these embodiments, the alkyl acrylate derivatives include halogenated species for example chlorinated species and fluorinated species.

In some embodiments of the present invention, the diffuser polymer particles are selected from rubbery alkyl acrylate polymers. In some aspects of these embodiments, the diffuser polymer particles are produced using $C_{2-8}$ alkyl acrylate monomers copolymerized with >4 wt % to 99 wt % crosslinking monomer(s). In some aspects of these embodiments, the diffuser polymer particles are produced using $C_{2-8}$ alkyl acrylate monomers copolymerized with >4 wt % to 50 wt % crosslinking monomer(s). In some aspects of these embodiments, the diffuser polymer particles are produced using $C_{2-8}$ alkyl acrylate monomers copolymerized with 5 wt % to 10 wt % crosslinking monomer(s). In some aspects of these embodiments, the diffuser polymer particles are produced using 0 to 50 wt % of other copolymerizable vinyl monomer(s). In some aspects of these embodiments, the $C_{2-8}$ alkyl acrylate monomers is butyl acrylate. In some aspects of these embodiments, the other copolymerizable vinyl monomer(s) is selected from alkyl methacrylates and monovinyl arenes. In some aspects of these embodiments, the other copolymerizable vinyl monomer(s) is styrene.

Crosslinking monomers suitable for use in producing the diffuser polymer particles of the present invention include crosslinking monomers well known to those skilled in the art that are compatible with the other materials from which the diffuser polymer particles are produced.

In some embodiments of the present invention, the crosslinking monomers are selected from multi-ethylenically unsaturated monomers in which the ethylenically unsaturated groups have approximately equal reactivity; multi-ethylenically unsaturated monomers having two or more non-conjugated double bonds of differing reactivity; and combinations thereof. In some aspects of these embodiments, the multi-ethylenically unsaturated monomers in which the ethylenically unsaturated groups have approximately equal reactivity are selected from divinylbenzene; glycol di- and trimethacrylates and acrylates; and triol triacrylates and methacrylates. In some aspects of these embodiments, the crosslinking monomers are selected from butylene glycol diacrylates. In some aspects of these embodiments, the multi-ethylenically unsaturated monomers having two or more non-conjugated double bonds of differing reactivity are selected from allyl methacrylate; diallyl maleate and allyl acryloxypropionate. In some aspects of these embodiments, the crosslinking monomer is allyl methacrylate. In some aspects of these embodiments, the crosslinking monomers include a combination of multi-ethylenically unsaturated monomers in which the ethylenically unsaturated groups have approximately equal reactivity and multi-ethylenically unsaturated monomers having two or more non-conjugated double bonds of differing reactivity.

In some embodiments of the present invention, the diffuser polymer particles are produced using post-cure reactions. In some aspects of these embodiments, the post-cure reaction occurs when a copolymer is formed from a monomer having a pendant peroxide group, which is then activated by heating to a temperature higher than that used in the polymerization. The activated peroxide group will promote crosslinking of the diffuser polymer particles. In some aspects of these embodiments, a second free-radical initiator can be added to the polymerization; this second initiator is selected to be stable under the initial polymerization conditions, but to be activated by, for example, exposure to light or increased temperature subsequent to the initial polymerization.

In some embodiments of the present invention, the diffuser polymer particles are prepared using any known polymerization technique suitable for use with the starting materials selected. In some aspects of these embodiments, although other techniques for preparing particles having the particle size, size distribution and spherical configuration can be used, the preparation of the diffuser polymer particles involves preparing uniformly sized seed particles by emulsion polymerizing at least one monomer component of the diffuser polymer particles, swelling the seed particles with one or more monomer components of the diffuser polymer particles, and polymerizing the monomer within the swelled seed particles. The swelling and polymerizing steps can be repeated as necessary to provide diffuser polymer particles of the desired size. In some aspects of these the procedure for making the diffuser polymer particles involves emulsion polymerizing the seed particles using conditions that restrict the molecular weight of the polymer that forms, such as by including chain-transfer moderators, e.g., mercaptans, in the polymerization mixture, such that the resulting seed particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight.

In some embodiments of the present invention, the light-scattering composition comprises a matrix polymer with diffuser polymer particles distributed therein, wherein the diffuser polymer particles comprise 0.1 to 40 wt % of the light-scattering composition. In some aspects of these embodiments, the diffuser polymer particles comprise 0.1 to 10 wt % of the light-scattering composition. In some aspects of these embodiments, the diffuser polymer particles comprise 0.3 to 5 wt % of the light-scattering composition.

In some embodiments of the present invention, the diffuser polymer particles have an average particle size of 0.3 to 1.9 µm. In some aspects of these embodiments, the diffuser polymer particles have an average particle size of 0.4 to 1.5 µm. In some aspects of these embodiments, the diffuser polymer particles have an average particle size of 0.5 to 1.3 µm. In some aspects of these embodiments, the diffuser polymer particles have an average particle size of 0.5 to 1.2 µm. In some aspects of these embodiments, the diffuser polymer particles have an average particle size of 0.5 to 1.0 µm. In some aspects of these embodiments, the diffuser polymer particles have an average particle size of 0.6 to 0.9 µm. In some aspects of these embodiments, the diffuser polymer particles have an average particle size of 0.8 to 0.9 µm.

In some embodiments of the present invention, the diffuser polymer particles exhibit a size distribution such that at least 90 wt % of the diffuser polymer particles fall within ±40% of the average particle size. In some aspects of these embodiments, the diffuser polymer particles exhibit a size distribution such that at least 90 wt % of the diffuser polymer particles fall within ±35% of the average particle size. In some aspects of these embodiments, the diffuser polymer particles exhibit a size distribution such that at least 90 wt % of the diffuser polymer particles fall within ±32% of the average particle size.

In some embodiments of the present invention, the diffuser polymer particles have a crosslinking density of >4 to 99 wt %. In some aspects of these embodiments, the diffuser polymer particles have a crosslinking density of 5 to 50 wt %. In some aspects of these embodiments, the diffuser polymer particles have a crosslinking density of 5 to 10 wt %.

In some embodiments of the present invention, the diffuser polymer particles have a refractive index at a center thereof ($RI_{center}$) that is less than a refractive index at a surface thereof ($RI_{surface}$). In some aspects of these embodiments, the $RI_{center}$ is 0.003 to 0.4 units less than the $RI_{surface}$. In some aspects of these embodiments the $RI_{center}$ is 0.008 to 0.1 units less than the $RI_{surface}$. In some aspects of these embodiments the $RI_{center}$ is 0.01 to 0.05 units less than the $RI_{surface}$. In some aspects of these embodiments the $RI_{center}$ is 0.01 to 0.03 units less than the $RI_{surface}$.

In some embodiments of the present invention, the $RI_{center}$ of the diffuser polymer particles is 1.2 to 1.6. In some aspects of these embodiments, the $RI_{center}$ of the diffuser polymer particles is 1.4 to 1.5.

In some embodiments of the present invention, the $RI_{center}$ of the diffuser polymer particles is within ±0.003 to ±0.6 units of the refractive index of the matrix polymer. In some aspects of these embodiments, the $RI_{center}$ of the diffuser polymer particles is within ±0.003 to <±0.05 units of the refractive index of the matrix polymer. In some aspects of these embodiments, the $RI_{center}$ of the diffuser polymer particles is within ±0.003 to ±0.04 units of the refractive index of the matrix polymer. In some embodiments, the $RI_{center}$ of the diffuser polymer particles is within ±0.02 to ±0.04 units of the refractive index of the matrix polymer. One of ordinary skill in the art given the specific teachings of this application will be able to select materials for the preparation of the diffuser polymer particles to provide said particles with the desired refractive index properties for use in combination with a particular matrix polymer.

In some embodiments of the present invention, the diffuser polymer particles are combined with the matrix polymers by any suitable, conventional technique. In some aspects of these embodiments, the diffuser polymer particles are combined with the matrix polymers by melt blending.

In some embodiments of the present invention, the light-scattering composition further comprises optional additives. In some aspects of these embodiments, the optional additives are selected from conventional additives, including, for example, ultraviolet-light stabilizers, ultraviolet-light absorbers, soluble flame retardants, dyes, thermal stabilizers, impact modifiers, processing aids, flow aids, pigments and fluorescent whitening agents. In some aspects of these embodiments, the light-scattering composition further comprises one or more impact modifiers. In some aspects of these embodiments, the impact modifiers are selected to form clear, non-light-scattering blends with the matrix polymer.

In some embodiments of the present invention, the matrix polymer, diffuser polymer particles and optional additives are blended and extruded into pellets, which are then molded or extruded.

In some embodiments of the present invention, the matrix polymer, diffuser polymer particles and optional additives are processed into sheet or film.

The light-scattering compositions of the present invention can be used in a variety of applications including light diffusers in luminaires, rear projection screens for television or film viewing, decoration, illuminated signs (especially back-lit translucent signs), skylight, lighting fixtures (especially for fluorescent or incandescent lighting), greenhouse glazing, light boxes, drafting tables, automotive sunroofs, artistic applications (e.g., as visual display-case components), anti-glow screens for CRT units, twin-wall glazing, liquid crystal displays, plasma displays, privacy windows, covers for automotive lights and coatings.

Some embodiments of the present invention will now be described in detail in the following Examples. All fractions and percentages set forth below in the Examples are by weight unless otherwise specified. The term Diffusivity ("Diff.") used in the Tables was obtained as the reciprocal of the integral of the output intensity versus the diffusing angle, measured by Goniophotometer and recorded as a percentage. On this scale a perfect diffuser would yield a diffusivity value of 100 percent.

EXAMPLE 1

This example illustrates the preparation of crosslinked polymer particles of 0.25 µm in diameter for making large seed particles in aqueous dispersion. The mixtures noted in Table 1 were prepared with deionized water:

TABLE 1

| Mixture | Component | Parts by Weight |
|---|---|---|
| A | Water | 180 |
|   | Sodium Carbonate | 0.40 |
| B | n-Butyl Acrylate | 98.0 |
|   | Allyl Methacrylate | 1.75 |
|   | 1,4-Butanediol Diacrylate | 0.25 |
|   | 22.5% aqueous Sodium Dodecylbenzenesulfonate | 2.22 |
|   | Water | 40.8 |
| C | Sodium Persulfate | 0.06 |
|   | Water | 11.9 |

A reactor equipped with stirrer and condenser and blanked with nitrogen was charged with Mixture A and heated to 83° C. To the reactor contents was added 10% of emulsified Mixture B and 25% of Mixture C. The temperature was maintained at 83° C. and the mixture was stirred for 60 minutes, after which the remaining Mixture B and Mixture C were added to the reactor with stirring over a period of 120 minutes. Stirring was continued at 83° C. for 90 minutes, after which the reactor contents were cooled to room temperature. The particle size of the resulting particles was 0.25 µm as measured by a Brookhaven Instruments particle size analyzer BI-90.

EXAMPLE 2

In this example the particles in the emulsion of Example 1 are grown to 0.56 µm diameter using n-butyl acrylate, styrene, and 1-hexanethiol. The mixtures noted in Table 2 were prepared with deionized water:

TABLE 2

| Mixture | Component | Parts by Weight |
|---|---|---|
| A | Sodium Carbonate | 0.08 |
|   | 9.76% aqueous Sodium Dodecylbenzenesulfonate | 0.01 |
|   | Water | 156.00 |
| B | 30.10% aqueous emulsion from Example 1 | 29.80 |
| C | n-Butyl Acrylate | 81.80 |
|   | Styrene | 18.20 |
|   | 9.76% aqueous Sodium Dodecylbenzenesulfonate | 4.53 |
|   | Water | 57.50 |
| D | 1-Hexanethiol | 18.80 |
|   | 9.76% aqueous Sodium Dodecylbenzenesulfonate | 0.58 |
|   | Water | 15.00 |
| E | Sodium Persulfate | 0.11 |
|   | Water | 47.40 |
| F | t-Butyl Hydroperoxide 70% | 0.30 |
|   | Water | 15.00 |
| G | Sodium Formaldehyde Sulfoxylate | 0.20 |
|   | Water | 6.67 |

Mixture A was added to the reactor of Example 1 and heated to 88° C. with stirring. The air in the reactor was replaced by nitrogen. When the reactor temperature stabilized at 88° C., Mixture B was charged into the reactor. Emulsified Mixtures C and D, and Mixture E were then added to the reactor, with stirring, over a period of 300 minutes. Stirring was continued at 88° C. for 90 minutes. The reactor contents were cooled to 65° C. Mixtures F and G were added and the reactor contents were maintained at 65° C. with stirring for 1 hour, after which the reactor contents were cooled to room temperature. The resulting emulsion particles had a diameter of 0.56 μm as measured by a Brookhaven Instruments particle size analyzer BI-90.

EXAMPLE 3

In this example a procedure similar to Example 1 was used to prepare crosslinked polymer particles in aqueous emulsion containing 99.30 parts of n-butyl acrylate and 0.70 part of allyl methacrylate. The resulting emulsion had a solids content of 32.52% and a particle size of 0.054 μm.

EXAMPLE 4

In this example the procedures in Example 2 were repeated using an appropriate amount of an emulsion similar to Example 3 having a particle size of 0.24 μm. The resulting emulsion had a particle size of 0.45 μm.

EXAMPLE 5

In this example the procedures in Example 2 were repeated using an appropriate amount of an emulsion similar to Example 3 having a particle size of 0.054 μm. The resulting emulsion had a particle size of 0.21 μm. The polymers derived from this synthesis recipe are as follows:

(80%($BA/ALMA$=94/6)//20%($MMA/BA$=98/2)), particle size of 1.2 microns (5A);

(80%($BA/ALMA$=94/6)//20%($MMA/BA$=98/2)), particle size of 1.3 microns (5B);

(80%($BA/ALMA$=94/6)//20%($MMA/BA$=98/2)), particle size of 1.1 microns (5C);

(80%($BA/ALMA$=94/6)//20%($MMA/BA$=98/2)), particle size of 1.2 microns (5D);

(80%($BA/ALMA$=94/6)//20%(Styrene)), particle size of 1.2 microns (5E);

(80%($BA/ALMA$=94/6)//20%($MMA/BA$=98/2)), particle size of 0.84 microns (5F).

EXAMPLE 6

In this example the procedures in Example 2 were repeated using an appropriate amount of an emulsion similar to Example 3 having a particle size of 0.054 μm, replacing styrene with methyl methacrylate, and replacing 1-hexanethiol with 20 parts by weight of butyl 3-mercaptopropionate. The resulting emulsion had a particle size of 0.21 μm. The polymer derived from this synthesis recipe is as follows: (80% (BA/ALMA=94/6)//20% (MMA/BA=98/2)), particle size of 1.2 microns.

EXAMPLE 7

In this example the procedures in Example 2 were repeated using an appropriate amount of an emulsion similar to Example 3 having a particle size of 0.054 μm, adding 1.0 part by weight of methyl β-cyclodextran in Mixture A, and replacing styrene with methyl methacrylate and 1-hexanethiol with 1-dodecanethiol. The resulting emulsion had a particle size of 0.23 μm. The resulting emulsion had a particle size of 0.21 μm. The polymers derived from this synthesis recipe are as follows:

(80%($BA/ALMA$=94/6)//20%($MMA/BA$=98/2)), particle size of 1.2 microns (7A);

(80%($BA/ALMA$=94/6)//20%($MMA/BA$=98/2)), particle size of 0.86 microns (7B);

(80%($BA/ALMA$=94/6)//20%($MMA/BA$=98/2)), particle size of 0.83 microns (7C);

(80%($BA/ALMA$=94/6)//20%($MMA/BA$=98/2)), particle size of 1.1 microns (7D);

(80%($BA/ALMA$=92/8)//20%($MMA/BA$=98/2)), particle size of 1.1 microns (7E);

(80%($BA/ALMA$=94/6)//20%($MMA/BA$=98/2)), particle size of 1.1 microns (7F);

(80%($BA/ALMA$=94/6)//20%(Styrene)), particle size of 1.1 microns (7G);

(80%($BA/ALMA$=94/6)//10%($MMA$)//10%($MMA$/Styrene=75/25)), particle size of 1.1 microns (7H);

(80%($BA/ALMA$=94/6)//10%($MMA$)//10%($MMA$/Styrene=50/50)), particle size of 1.1 microns (7I);

(80%($BA/ALMA$=94/6)//10%($MMA$)//10%($MMA$/Styrene=25/75)), particle size of 1.1 microns (7J);

(80%($BA/ALMA$=94/6)//10%($MMA/ALMA$=98/2)//10%($MMA$/Styrene=25/75)), particle size of 1.1 microns (7K);

(80%($BA/ALMA$=94/6)//10%($MMA$/Styrene=50/50)//10%(Styrene)), particle size of 1.1 microns (7L);

(80%($BA/ALMA$=94/6)//10%($MMA$/Styrene=75/25)//10%(Styrene)), particle size of 0.85 microns (7M);

(80%($BA/ALMA$=94/6)//10%($MMA$/Styrene=50/50)//10%(Styrene)), particle size of 0.85 microns (7N);

(80%($BA/ALMA$=94/6)//10%($MMA$/Styrene=25/75)//10%(Styrene)), particle size of 0.85 microns (7O);

(80%($BA/ALMA$=94/6)//10%($MMA/ALMA$/Styrene=48/2/50)//10%(Styrene)), particle size of 0.85 microns (7P);

(80%($BA/ALMA$=94/6)//20%($MMA/EA$=98/02), particle size of 0.85 microns (7Q);

(80%($BA/ALMA$=92/8)//20%($MMA/EA$=98/02), particle size of 0.85 microns (7R);

and, (80%($BA/ALMA$=94/6)//10%($MMA$/Styrene=25/75)//10%(Styrene)), particle size of 0.85 microns (7S).

COMPARATIVE EXAMPLE 8

In this example the particles in the emulsion of Example 2 are expanded to 5 μm diameter using n-butyl acrylate and ally methacrylate in Stage I which is then followed by Stage 11 copolymerization of methyl methacrylate and ethyl acrylate. The mixtures noted in Table 3 were prepared with deionized water:

TABLE 3

| Mixture | Component | Parts by Weight |
|---|---|---|
| | Stage I | |
| A | Water | 138.50 |
| B | Aqueous emulsion from Example 2 at 29.88% solids | 0.105 |
| C | n-Butyl Acrylate | 76.80 |
| | Allyl Methacrylate | 3.20 |
| | 10% aqueous Sodium Dodecylbenzenesulfonate | 0.28 |
| | Water | 33.12 |
| D | t-Butyl Peroctoate | 0.427 |
| | 10% aqueous Sodium Dodecylbenzenesulfonate | 0.003 |
| | Water | 2.96 |
| | Stage II | |
| E | Methyl Methacrylate | 19.20 |
| | Ethyl Acrylate | 0.80 |
| F | Sodium Formaldehyde Sulfoxylate | 0.062 |
| | Water | 6.67 |
| | 10% aqueous Sodium Dodecylbenzenesulfonate | 0.017 |
| G | t-Butyl Hydroperoxide 70% | 0.089 |
| | Water | 10.05 |
| | 10% aqueous Sodium Dodecylbenzenesulfonate | 0.037 |

To the reactor of Example 1 was added A which was heated to 90° C. with stirring. The air in the reactor was replaced by nitrogen. When the reactor temperature stabilized at 90° C., Mixture B was charged into the reactor. Mixture C was emulsified with a homogenizer and charged into the reactor. The reactor was stirred at 60° C. for 1 hour. Mixture D was emulsified with a homogenizer and charged into the reactor. After 1 hour agitation at 60° C., the reactor was gradually heated to 65-70° C. while an exothermic polymerization takes place. After reach peak temperature, agitation was continued while the reactor was cooled to 73° C. in 30 minutes. Charge half of Mixture F. Mixtures E, the remainder of F, and G were then separately added into the reactor over a period of 2 hours. The temperature was maintained between 73-75° C. and stirring was continued for 1 hour before the reactor was cooled to room temperature. The resulting emulsion particles had a diameter of 5 μm as measured by a Coulter Corporation Multisizer IIE particle size analyzer.

COMPARATIVE EXAMPLE 9

In this example the particles in the emulsion of Comparative Example 8 are mixed with a polymer emulsion containing a methyl methacrylate/ethyl acrylate copolymer. The mixtures noted in Table 4 were prepared:

TABLE 4

| Mixture | Component | Parts by Weight |
|---|---|---|
| A | Aqueous emulsion from Example 8 at 35.95% solids | 250.35 |
| B | Aqueous emulsion of methyl methacrylate/ethyl acrylate copolymer ∓ at 45.00% solids | 22.22 |

∓96 wt % methyl methacrylate/4 wt % ethyl acrylate

To the reactor of Example 1 was added A. With stirring at room temperature, B was added to the reactor. The stirring was continued for 15 minutes before the mixture was taken out of the reactor. Water was then evaporated off from the mixture to produce dried powder.

EXAMPLES 10-13

Light diffuser beads of the compositions given in Table 5, were dry blended in polycarbonate resin (Lexan 141, RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 5

| Ex. No. | Diffuser | Loading (wt %) | Total Trans. (%) | Yellowness Index | Haze (%) | Diff. (%) |
|---|---|---|---|---|---|---|
| 10 | Comp. 8 | 1.00 | 59.98 | 7.62 | 86.38 | 10.01 |
| 11 | Comp. 9 | 1.00 | 64.23 | 10.09 | 86.20 | 7.39 |
| 12 | Comp. 8 | 4.00 | 48.60 | 3.58 | 86.31 | 37.38 |
| 13 | Comp. 9 | 4.00 | 48.71 | 6.69 | 86.29 | 30.38 |

EXAMPLES 14-17

Light diffuser beads of the compositions given in Table 6, were dry blended in PMMA resin (V-826-100; RI=1.49) followed by melt compounding in a Leistritz extruder at barrel temperatures that range from 200 to 234° C. The melt compounding was followed by pelletization, drying, at 60° C. in a vacuum oven, and injection molding at temperatures between 250 and 270° C. The test plates, derived from injection molding, were of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 6

| Ex. No. | Diffuser | Loading (wt %) | Total Trans. (%) | Yellowness Index | Haze (%) | Diff. (%) |
|---|---|---|---|---|---|---|
| 14 | Comp. 8 | 1.00 | 102.55 | 1.12 | 72.34 | 0.93 |
| 15 | Comp. 9 | 1.00 | 101.45 | 1.10 | 66.81 | 0.97 |
| 16 | Comp. 8 | 4.00 | 101.89 | 1.97 | 83.29 | 1.70 |
| 17 | Comp. 9 | 4.00 | 102.98 | 1.74 | 82.41 | 1.40 |

EXAMPLES 18-26

Light diffuser beads of the compositions given in Table 7, were dry blended in polycarbonate resin (Lexan 141; RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 7

| Ex. No. | Diffuser | Loading (wt %) | Total Trans. (%) | Yellowness Index | Haze (%) | Diff. (%) |
|---|---|---|---|---|---|---|
| 18 | 5A | 0.50 | 51.92 | 8.72 | 86.01 | 15.87 |
| 19 | 5A | 1.00 | 47.18 | 6.64 | 85.92 | 26.21 |
| 20 | 5A | 1.50 | 45.17 | 7.65 | 85.83 | 34.37 |
| 21 | 5B | 0.50 | 54.90 | 7.70 | 86.07 | 13.40 |
| 22 | 5B | 1.00 | 49.63 | 4.25 | 85.91 | 23.41 |
| 23 | 5B | 1.50 | 46.28 | 5.43 | 85.81 | 31.03 |
| 24 | Comp. 8 | 0.50 | 65.65 | 7.75 | 85.61 | 6.02 |
| 25 | Comp. 8 | 1.00 | 55.79 | 5.43 | 85.93 | 12.02 |
| 26 | Comp. 8 | 1.50 | 51.14 | 3.99 | 86.00 | 18.23 |

EXAMPLES 27-41

Light diffuser beads of the compositions given in Table 8, were dry blended in polycarbonate resin (Lexan 141; RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 8

| Ex. No. | Diffuser | Loading (wt %) | Total Trans. (%) | Yellowness Index | Haze (%) | Diff. (%) |
|---|---|---|---|---|---|---|
| 27 | 5C | 0.50 | 56.00 | 9.52 | 86.02 | 11.47 |
| 28 | 5C | 1.00 | 47.86 | 6.28 | 85.94 | 24.59 |
| 29 | 5C + 1% UVITEX-OB | 0.50 | 56.92 | 4.89 | 86.02 | 12.48 |
| 30 | 5D | 0.50 | 58.57 | 10.07 | 85.95 | 10.37 |
| 31 | 5D | 1.00 | 49.44 | 5.71 | 85.98 | 22.73 |
| 32 | 5D + 1% UVITEX-OB | 0.05 | 59.82 | 7.24 | 85.99 | 10.23 |
| 33 | 5E | 0.50 | 60.07 | 10.70 | 85.94 | 9.26 |
| 34 | 5E | 1.00 | 51.09 | 6.73 | 85.70 | 19.01 |
| 35 | 5E + 1% UVITEX-OB | 0.50 | 62.17 | 8.10 | 85.91 | 8.73 |
| 36 | 6A | 0.50 | 57.78 | 9.20 | 85.97 | 10.26 |
| 37 | 6A | 1.00 | 50.42 | 4.56 | 86.00 | 21.50 |
| 38 | 6A + 1% UVITEX-OB | 0.50 | 59.11 | 6.29 | 86.01 | 10.53 |
| 39 | 5F | 0.50 | 53.56 | 6.61 | 86.04 | 16.07 |
| 40 | 5F | 1.00 | 48.50 | 5.55 | 85.94 | 26.86 |
| 41 | 5F + 1% UVITEX-OB | 0.50 | 56.71 | 4.75 | 86.01 | 12.88 |

EXAMPLES 42-53

Light diffuser beads of the compositions given in Table 9, were dry blended in polycarbonate resin (Lexan 141; RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 9

| Ex. No. | Diffuser | Loading (wt %) | Total Trans. (%) | Yellowness Index | Haze (%) | Diff. (%) |
|---|---|---|---|---|---|---|
| 42 | 7A | 0.50 | 59.61 | 9.65 | 85.91 | 10.34 |
| 43 | 7A | 1.00 | 50.93 | 4.96 | 85.95 | 22.26 |
| 44 | 7A + 1% UVITEX-OB | 0.50 | 63.10 | 7.97 | 85.89 | 8.41 |
| 45 | 7B | 0.50 | 55.96 | 6.94 | 85.98 | 13.75 |
| 46 | 7B | 1.00 | 50.39 | 4.90 | 85.93 | 26.93 |
| 47 | 7B + 1% UVITEX-OB | 0.05 | 57.68 | 5.64 | 85.98 | 11.73 |
| 48 | 0.9(7A) + 0.1(EXL-2330) | 0.50 | 58.76 | 8.34 | 85.97 | 11.01 |
| 49 | 0.9(7A) + 0.1(EXL-2330) | 1.00 | 51.36 | 4.00 | 85.96 | 24.57 |
| 50 | 0.9(7A) + 0.1(EXL-2330) + 1% UVITEX-OB | 0.50 | 58.22 | 5.86 | 85.97 | 12.28 |
| 51 | 0.9(7B) + 0.1(EXL-2330) | 0.50 | 55.89 | 6.29 | 85.97 | 14.07 |
| 52 | 0.9(7B) + 0.1(EXL-2330) | 1.00 | 49.41 | 6.03 | 85.88 | 27.30 |
| 53 | 0.9(7B) + 0.1(EXL-2330) + 1% UVITEX-OB | 0.50 | 55.04 | 3.39 | 85.99 | 15.08 |

EXAMPLES 54-56

Light diffuser beads of the compositions given in Table 10, were dry blended in polycarbonate resin (NAS-21; RI=1.57) followed by melt compounding in a Leistritz extruder at barrel temperature ranging from 200 to 224° C. The melt compounding was followed by pelletization, drying, at 60 C. in a vacuum oven, and injection molding at temperatures between 200 and 234° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 10

| Ex. No. | Diffuser | Loading (wt %) | Total Trans. (%) | Yellowness Index | Haze (%) | Diff. (%) |
|---|---|---|---|---|---|---|
| 54 | 5F | 1.00 | 59.23 | 4.46 | 85.76 | 18.79 |
| 55 | 5F | 2.00 | 53.53 | 9.14 | 85.48 | 32.10 |
| 56 | 5F + 1% UVITEX-OB | 1.00 | 56.97 | −1.44 | 85.82 | 21.87 |

EXAMPLES 57-68

Light diffuser beads of the compositions given in Table 11, were dry blended in polycarbonate resin (Lexan 141; RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 11

| Ex. No. | Diffuser | Loading (wt %) | Total Trans. (%) | Yellowness Index | Haze (%) | Diff. (%) |
|---|---|---|---|---|---|---|
| 57 | 7C | 0.50 | 52.39 | 6.26 | 85.95 | 18.40 |
| 58 | 7C | 1.00 | 48.24 | 5.47 | 85.83 | 34.89 |
| 59 | 7C + 0.5% Silica | 0.50 | 53.26 | 4.5 | 85.99 | 17.86 |
| 60 | 7C + 1.0% Silica | 0.50 | 53.95 | 4.5 | 85.96 | 17.46 |
| 61 | 7D | 0.50 | 54.75 | 4.73 | 85.96 | 16.60 |
| 62 | 7D | 1.00 | 50.50 | 2.30 | 85.89 | 29.58 |
| 63 | 7E | 0.50 | 55.27 | 4.63 | 85.95 | 15.42 |
| 64 | 7E | 1.00 | 51.06 | 1.82 | 85.88 | 29.47 |
| 65 | 7F | 0.50 | 68.65 | 15.75 | 84.22 | 3.82 |
| 66 | 7F | 1.00 | 57.49 | 11.90 | 85.77 | 10.81 |
| 67 | 7G | 0.50 | 70.34 | 14.52 | 84.53 | 4.17 |
| 68 | 7G | 1.00 | 59.45 | 11.49 | 85.78 | 10.24 |

EXAMPLES 69-78

Light diffuser beads of the compositions given in Table 12, were dry blended in polycarbonate resin (NAS-21; RI=1.57) followed by melt compounding in a Leistritz extruder at barrel temperature ranging from 200 to 224° C. The melt compounding was followed by pelletization, drying, at 60 C. in a vacuum oven, and injection molding at temperatures between 200 and 234° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 12

| Ex. No. | Diffuser | Loading (wt %) | Total Trans. (%) | Yellowness Index | Haze (%) | Diff. (%) |
|---|---|---|---|---|---|---|
| 69 | 7H | 0.50 | 86.64 | 12.99 | 87.22 | 15.24 |
| 70 | 7H | 1.00 | 85.61 | 11.82 | 87.20 | 28.72 |
| 71 | 7I | 0.50 | 89.15 | 12.52 | 87.23 | 13.47 |
| 72 | 7I | 0.50 | 85.64 | 11.08 | 87.22 | 27.23 |
| 73 | 7J | 0.50 | 87.84 | 11.57 | 87.20 | 16.12 |
| 74 | 7J | 1.00 | 85.53 | 10.95 | 87.20 | 29.01 |
| 75 | 7K | 0.50 | 86.64 | 11.22 | 87.22 | 16.07 |
| 76 | 7K | 1.00 | 85.21 | 10.46 | 87.20 | 27.76 |
| 77 | 7L | 0.50 | 89.60 | 11.00 | 87.21 | 14.65 |
| 78 | 7L | 1.00 | 87.39 | 9.14 | 87.21 | 25.78 |

EXAMPLES 79-90

Light diffuser beads of the compositions given in Table 13, were dry blended in polycarbonate resin (Lexan 141; RI=1.59) followed by melt compounding in a Leistritz extruder at barrel temperature ranging from 190 to 288° C. The melt compounding was followed by pelletization, drying, at 60 C. in a vacuum oven, and injection molding at temperatures between 250 and 270° C. The test plates derived from injection molding are of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 13

| Ex. No. | Diffuser | Loading (wt %) | Total Trans. (%) | Yellowness Index | Haze (%) | Diff. (%) |
|---|---|---|---|---|---|---|
| 79 | 7M | 0.50 | 52.80 | 8.87 | 84.03 | 15.14 |
| 80 | 7M | 1.00 | 48.98 | 6.27 | 83.93 | 38.53 |
| 81 | 7N | 0.50 | 56.58 | 10.20 | 84.00 | 13.47 |
| 82 | 7N | 1.00 | 50.27 | 5.13 | 83.96 | 34.70 |
| 83 | 7O | 0.50 | 54.95 | 6.32 | 84.00 | 15.83 |
| 84 | 7O | 1.00 | 49.82 | 4.88 | 83.92 | 31.96 |
| 85 | 7P | 0.50 | 55.12 | 7.10 | 84.00 | 13.61 |
| 86 | 7P | 1.00 | 49.47 | 5.21 | 83.92 | 30.04 |
| 87 | 7Q | 0.50 | 53.23 | 5.67 | 84.01 | 18.84 |
| 88 | 7Q | 1.00 | 49.66 | 4.43 | 83.91 | 30.56 |
| 89 | 7R | 0.50 | 54.29 | 5.25 | 84.01 | 16.92 |
| 90 | 7R | 1.00 | 49.69 | 4.76 | 83.91 | 29.04 |

EXAMPLE 91

Light diffuser beads of the compositions given in Table 14, were dry blended in PMS resin (Aldrich Chemical Co.; RI=1.53) followed by melt compounding in a Leistritz extruder at barrel temperatures that range from 200 to 224° C. The melt compounding was followed by pelletization, drying, at 60° C. in a vacuum oven, and injection molding at temperatures between 200 and 234° C. The test plates, derived from injection molding, were of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 14

| Ex. No. | Diffuser | Loading (wt %) | Total Trans. (%) | Yellowness Index | Haze (%) | Diff. (%) |
| --- | --- | --- | --- | --- | --- | --- |
| 91 | 7R | 1.00 | 76.01 | 9.69 | 83.06 | 4.19 |

EXAMPLES 92-95

Light diffuser beads of the compositions given in Table 15, were dry blended in PS resin (PSJ-Polystyrene G9305; RI=1.5842) followed by melt compounding in a Leistritz extruder at barrel temperatures that range from 200 to 224° C. The melt compounding was followed by pelletization, drying, at 60° C. in a vacuum oven, and injection molding at temperatures between 200 and 234° C. The test plates, derived from injection molding, were of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 15

| Ex. No. | Diffuser | Loading (wt %) | Total Trans. (%) | Yellowness Index | Haze (%) | Diff. (%) |
| --- | --- | --- | --- | --- | --- | --- |
| 92 | 7R | 1.00 | 58.15 | 8.33 | 83.91 | 26.99 |
| 93 | 7R | 2.00 | 54.37 | 12.56 | 83.71 | 35.39 |
| 94 | 7O | 1.00 | 58.01 | 8.49 | 83.95 | 22.39 |
| 95 | 7O | 2.00 | 54.94 | 11.62 | 83.78 | 37.77 |

EXAMPLES 96-103

Light diffuser beads of the compositions given in Table 16, were dry blended in PMS resin (Aldrich Chemical Co.; RI=1.57) followed by melt compounding in a Leistritz extruder at barrel temperatures that range from 200 to 224° C. The melt compounding was followed by pelletization, drying, at 60° C. in a vacuum oven, and injection molding at temperatures between 200 and 234° C. The test plates, derived from injection molding, were of the following dimension: 77 mm×56 mm×3 mm. These plates were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

TABLE 16

| Ex. No. | Diffuser | Loading (wt %) | Total Trans. (%) | Yellowness Index | Haze (%) | Diff. (%) |
| --- | --- | --- | --- | --- | --- | --- |
| 96 | 7R | 1.00 | 59.41 | 7.00 | 85.75 | 16.06 |
| 97 | 7R | 2.00 | 57.17 | 9.19 | 85.59 | 26.93 |
| 98 | 7R | 1.00 | 60.30 | 6.87 | 85.75 | 14.84 |
| 99 | 7R | 2.00 | 57.59 | 8.36 | 85.72 | 24.20 |
| 100 | 7R | 1.00 | 59.62 | 6.15 | 85.72 | 17.28 |
| 101 | 7R | 2.00 | 56.41 | 9.92 | 85.53 | 26.21 |
| 102 | 7R | 1.00 | 59.74 | 5.90 | 85.74 | 15.86 |
| 103 | 7R | 2.00 | 56.26 | 9.83 | 85.52 | 26.85 |

We claim:

1. A light-scattering composition, comprising
   a matrix polymer;
   diffuser polymer particles;
   wherein the diffuser polymer particles have an average particle size 0.8 to 0.9 µm;
   wherein the diffuser polymer particles comprise >4 wt % crosslinking density;
   wherein the diffuser polymer particles exhibit a different refractive index at a center thereof ($RI_{center}$) than at a surface thereof ($RI_{surface}$);
   wherein $RI_{center} < RI_{surface}$;
   wherein the diffuser polymer particles are produced using at least one $C_{2-8}$ alkyl acrylate monomer copolymerized with >4 wt % to 10 wt % cross linking monomer, and optionally, comonomers selected from alkyl methacrylate monomers and monovinyl arenes; and,
   wherein the diffuser polymer particles are single phase particles that exhibit a gradual change in refractive index from the innermost point to the surface of the particles;
   wherein the diffuser polymer particles are distributed throughout the matrix polymer; and,
   wherein the diffuser polymer particles comprise 0.1 to 10 wt % of the light-scattering composition.

2. The light-scattering composition of claim 1, wherein the diffuser polymer particles exhibit a size distribution such that at least 90 wt % of the diffuser polymer particles fall within ±32% of the average particle size.

3. The light-scattering composition of claim 1, further comprising an impact modifier.

4. The light-scattering composition of claim 1, wherein the of relationship between $RI_{center}$ the diffuser particles and a refractive index of the matrix polymer ("$RI_{matrix}$") is ($RI_{matrix} - 0.05$) < $RI_{center}$ < ($RI_{matrix} - 0.003$); or ($RI_{matrix} + 0.003$) < $RI_{center}$ < ($RI_{matrix} + 0.05$).

5. The light-scattering composition of claim 1, wherein the relationship between $RI_{center}$ of the diffuser particles and a refractive index of the matrix polymer ("$RI_{matrix}$") is ($RI_{matrix} - 0.04$) < $RI_{center}$ < ($RI_{matrix} - 0.003$); or ($RI_{matrix} + 0.004$) < $RI_{center}$ < ($RI_{matrix} + 0.04$).

6. The light-scattering composition of claim 1, wherein the matrix polymer is selected from the group consisting of polymethyl methacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride, copolymers, cyclic olefin copolymers and combinations thereof.

7. A flat panel display having a diffusion layer comprising a light-scattering composition of claim 1, wherein the diffusion layer is 0.45 mm to 4 mm thick.

8. A lighting diffuser comprising a light-scattering composition of claim 1.

9. The light-scattering composition of claim 1, wherein the matrix polymer is selected from the group consisting of acrylonitrile-butadiene-styrene (ABS), polyolefins, polycarbonates, polycarbonate-polyester blends, polyamides, poly(alkylene terephthalates), polystyrene, cyclo-olefins, polystyrene/methacrylate blends, and combinations thereof.

10. The light-scattering composition of claim 1, wherein the matrix polymer is selected from the group consisting of acrylonitrile-butadiene-styrene (ABS), polyolefins, polycarbonates, polycarbonate-polyester blends, polyamides, poly(alkylene terephthalates), polystyrene, cyclo-olefins and polystyrene/methacrylate blends.

* * * * *